United States Patent
Olafsson et al.

(10) Patent No.: US 7,015,400 B2
(45) Date of Patent: Mar. 21, 2006

(54) APPARATUS AND METHOD FOR CONTROLLING THE BELT TENSION OF A BELT WEIGHER

(75) Inventors: Jon Olafsson, Gardabaer (IS); Kristinn Steingrimsson, Reykjavik (IS); Bjarni Valur Valtysson, Reykjavik (IS)

(73) Assignee: Marel HF, Gardabaer (IS)

( * ) Notice: Subject to any disclaimer, the term of this patent is extended or adjusted under 35 U.S.C. 154(b) by 0 days.

(21) Appl. No.: 10/485,527

(22) PCT Filed: Aug. 2, 2002

(86) PCT No.: PCT/IS02/00015

§ 371 (c)(1),
(2), (4) Date: Jul. 16, 2004

(87) PCT Pub. No.: WO03/001230

PCT Pub. Date: Feb. 13, 2003

(65) Prior Publication Data

US 2004/0238232 A1 Dec. 2, 2004

(30) Foreign Application Priority Data

Aug. 3, 2001 (IS) .......................................... 6037

(51) Int. Cl.
*G01G 21/03* (2006.01)
*G01G 23/06* (2006.01)
*G01G 23/48* (2006.01)
*B65G 23/44* (2006.01)

(52) U.S. Cl. ........................ 177/119; 177/145; 73/1.13; 474/101; 198/813

(58) Field of Classification Search ............ 177/16–17, 177/119, 145; 73/1.13, 1.15; 702/101, 102; 474/101–102; 198/813

See application file for complete search history.

(56) References Cited

U.S. PATENT DOCUMENTS 3,623,559 A * 11/1971 Folkes .......................... 177/1

(Continued)

FOREIGN PATENT DOCUMENTS

DE 3637212 A1 * 5/1988 .................. 474/111

(Continued)

*Primary Examiner*—Randy W. Gibson
(74) *Attorney, Agent, or Firm*—Nixon & Vanderhye P.C.

(57) ABSTRACT

A belt weighing apparatus for maintaining high accuracy in weighing by way of maintaining a fixed tension in the belt and preventing the belt from oscillating. The belt conveyor is comprised of a supporting frame, an upper guiding unit arranged on the supporting frame, a first and a second end-supporting device arranged on the supporting frame in proximity to the opposite ends of the upper guiding unit, a motor unit, at least one weighing platform arranged in-between the first and a second end-supporting devices, a lower guiding unit having a first property arranged on the supporting frame, and an endless conveyor belt having a second property is extended between said first and a second end supporting devices. At any instant of time an upper part of the belt rests on the upper guiding unit and the weighing platform defining a conveying pad of the belt weighing apparatus, and the lower part of the belt defining the return way of the belt weighing apparatus rests partly on the lower guiding unit that acts as a support for part of the lower run while another part of the belt hangs freely. The accuracy in the weighing is maximized by matching the first and the second properties such that any heat expansion or contraction of the belt will be compensated at least partly through expansion or contraction of the lower guiding unit.

14 Claims, 3 Drawing Sheets

U.S. PATENT DOCUMENTS

Figure 1:
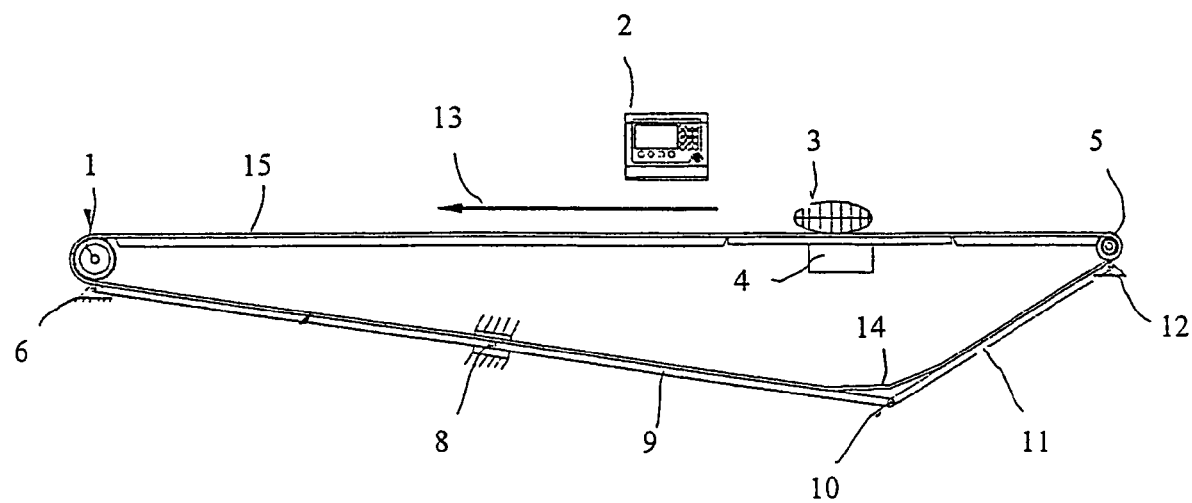

| | | | | |
|---|---|---|---|---|
| 3,924,729 | A * | 12/1975 | Flinth et al. | 177/16 |
| 4,128,164 | A * | 12/1978 | Sandberg | 198/813 |
| 5,170,857 | A | 12/1992 | Phillips et al. | 177/145 |
| 5,288,276 | A * | 2/1994 | Golovatgai-Schmidt et al. | 474/133 |
| 5,591,942 | A * | 1/1997 | Hyer | 177/16 |
| 6,485,383 | B1 * | 11/2002 | Hendricks et al. | 474/101 |
| 6,503,163 | B1 * | 1/2003 | Van Sant et al. | 474/101 |
| 6,509,533 | B1 * | 1/2003 | Tanaka et al. | 177/126 |

FOREIGN PATENT DOCUMENTS

| | | |
|---|---|---|
| EP | 0592349 B1 | 4/1994 |
| GB | 1491573 | 11/1977 |
| WO | 99/36752 | 7/1999 |

* cited by examiner

APPARATUS AND METHOD FOR CONTROLLING THE BELT TENSION OF A BELT WEIGHER

This application is the U.S. national phase of international application PCT/IS02/00015 filed in English on 2 Aug. 2002, which designated the U.S. PCT/IS02/00015 claims priority to IS Application No. 6037, filed 3 Aug. 2001. The entire contents of these applications are incorporated herein by reference.

FIELD OF THE INVENTION

The present invention relates to a belt weighing apparatus and a method for weighing with high accuracy and maintaining said high accuracy in the weighing by means of maintaining a fixed tension in the belt and preventing the belt from oscillating.

BACKGROUND

The weighing of individual food items transported along a conveyor is today an important operation in processing food items. If one had to weigh every item individually on a stationary weighing unit, the processing speed would be extremely low.

A belt weigher is an instrument used for weighing items while the items are being conveyed and is basically a conveyor with a built in weighing platform. Such belt weighers have been known for quite some time in the food processing industry. In the last years there has been some development is such belt weighers with the aim of providing a fast belt weighers with high accuracy. This is essential in the food processing to measure as exact as possible the weight of the object being processed prior to various types of operations such as sorting, cutting, or packaging.

One of the main problems that arises in such belt weighers, especially those available for the food processing industry is the fact that the tension, flexibility and the weight of the belt will affect the accuracy of the weighing. A stiff and heavy belt will degrade the accuracy more than a light and flexible belt. The tension of the belt has therefore a large influence on the accuracy of the weighing. A high tension causes a lower accuracy in weighing than a low tension of the belt. Accordingly, to maximize the accuracy of the belt weight it is best to use a belt that is light and flexible with as low tension as possible, but still high enough for the driving mechanism to move the conveyor belt while the driving sprocket that runs the belt must have a secure grip on the belt.

Another important issue in maintaining a high accuracy in the weighing is to prevent the belt from oscillating, where any oscillation of the belt will also affect the accuracy of the weighing process. Other parameters that affect the accuracy in the weighing are temperature fluctuations and wearing in the belt.

Through the temperature increase the length of the belt increases, which varies the tension in the belt and therefore the accuracy in the weighing, and vice verse, through a decrease in the temperature the length of the belt decreases and the tension increases.

The problem with the tension of the belt has partly been solved by using modular plastic belt and let it hang on the return-way on a few load-bearing rollers. This has the drawback that the belt can easily oscillate and therefore affect the weighing.

There is therefore a need for a belt weigher where the tension of the belt is maintained optimal and wherein the oscillation are reduced so that accuracy of the weighing may be increased.

GENERAL DESCRIPTION OF THE INVENTION

It is an object of the present invention to provide a belt weighing apparatus and a method so that the weighing accuracy is not affected by temperature fluctuations and wherein the oscillations (vibrations) in the belt are reduced. Furthermore, with the present invention the size of the belt weigher can be increased without affecting the weighing performance.

According to the first aspect the present invention relates to a belt weighing apparatus for weighing with high accuracy and maintaining said high accuracy in the weighing by means of maintaining a fixed tension in the belt and preventing the belt from oscillating, said apparatus comprising:

a supporting frame,
a upper guiding unit arranged on the supporting frame,
a first and a second end-supporting means arranged on the supporting frame in a proximity to the opposite ends of the upper guiding unit,
a motor unit,
at least one weighing platform arranged in-between the first and a second end-supporting means,
a lower guiding unit having a first characteristic property arranged on the supporting frame, and
a conveyor belt having a second characteristic property and forms an endless loop and is extended between said first and a second end-supporting means, the motor unit being adapted to move the belt in a revolving manner such that at any instant of time an upper part of the belt rests on the upper guiding unit and the weighing platform defining a conveying part of the belt weighing apparatus, and the lower part of the belt defining the return way of the belt weighing apparatus rests partly on the lower guiding unit that acts as a supporting means while the subsequent part is hanging freely, said support and said freely hanging part being adapted to minimize the oscillation in the belt and to create an optimal tension in the belt so that the accuracy in the weighing is maximized, the first and the second characteristic properties being such that any heat expansion or contraction of the belt will be compensated at least partly through expansion or contraction of the lower guiding unit so that the tension is maintained fixed and therefore the weighing.

In a preferred embodiment the lower guiding unit comprises an open V-shape structure. This structure may be formed by a set of two sub-units mounted together in a mutual meeting points and with the opposite ends of the two sub-units arranged on the supporting frame in a proximity to the opposite ends of the upper guiding unit. The mounting in the mutual meeting point may be through a hinge system that allows a downward movement of the meeting point when the lower guiding unit expands, and movement upwards of the meeting point when the lower guiding unit contracts, wherein said movements result in a rotation around the mutual meeting point. In one embodiment each sub-unit comprises at least two parallel rods of equal length, acting as a supporting means for the belt, wherein the length of the rods in the first sub-set is $I_1$ and the length of the rods in the second sub-set is $I_2$ with the condition that $I_1 > I_2$. Another preferred condition is that the angle $\alpha$ between said sub-units is in the interval $90 < \alpha < 180°$. Due to the preferred V-shape structure of the lower guiding unit the freely hanging part of the belt is in the area of the mutual meeting point where the two sets of sub-units meet, the belt having therefore a concave shape.

The characteristic properties are preferably the coefficient of thermal expansion, which are selected such that said expansion or contraction of the lower guiding unit followed with said expansion or contraction of the belt is such that the length of the freely hanging part remains fixed, and therefore the tension in the belt. The materials that the guiding units and the belt may be made of are at least one of the following materials:

Polyamid 6,
Polyamid 11,
Polycarbonta,
Polyetereterketon,
Polyethylene,
Polypropylene, and
Acetal.

In one preferred embodiment the motor unit is integrated into the first end-supporting means defining a driving sprocket wheel. Furthermore, it is preferred that the second end-supporting is an idle wheel.

The belt weighing apparatus is in one embodiment adapted to weigh and generate portions with at least one criteria, wherein the criteria can be a fixed weight portion. In this embodiment a computer controlled guiding arms and a plurality of bins are arranged along the belt weighing apparatus. A computer system is connected to said weighing platform and stores all the weighing results and utilizes said results in generating a portion with said criterion. Furthermore, said computer system traces each item in the sense that it utilizes the position of item on the weighing platform when the item is weighed and the speed of the conveyor belt to trace its position and to control said guiding arms in guiding the item(s) into a selected bin.

In another preferred embodiment, the belt weighing apparatus is implemented in-between an in-feed conveyor and a discharge conveyor, where its function is solely to weigh the items that are being conveyed, where the discharge conveyor generates portions from said items. Also here the weighed items are traced so their position is at any instant of time known.

According to the second aspect the present invention relates to a method for weighing with high accuracy in a belt weighing apparatus and maintaining said high accuracy in the weighing by means of maintaining a fixed tension in the belt and preventing the belt from oscillating, said method comprising:

providing a upper guiding unit, arranging a first and a second end-supporting means in a proximity to the opposite ends of the upper guiding unit, arranging at least one weighing platform in-between the first and a second end-supporting means, providing a lower guiding unit having a first characteristic property, extending a conveyor belt having a second characteristic property and which forms an endless loop between said first and a second end-supporting means and move the belt in a revolving manner such that at any instant of time an upper part of the belt rests on the upper guiding unit and the weighing platform defining a conveying part of the belt weighing apparatus, and the lower part of the belt defining the return way of the belt weighing apparatus rests partly on the lower guiding unit that acts as a supporting means while the subsequent part is hanging freely, wherein said support and said freely hanging part of the lower part of the belt are adapted to minimize the oscillation in the belt and to create an optimal tension in the belt so that the accuracy in the weighing is maximized, the first and the second characteristic properties being such that any expansion or contraction of the belt will be compensated at least partly through expansion or contraction of the lower guiding unit so that the tension is maintained fixed and therefore the weighing.

DETAILED DESCRIPTION

Figure 2:
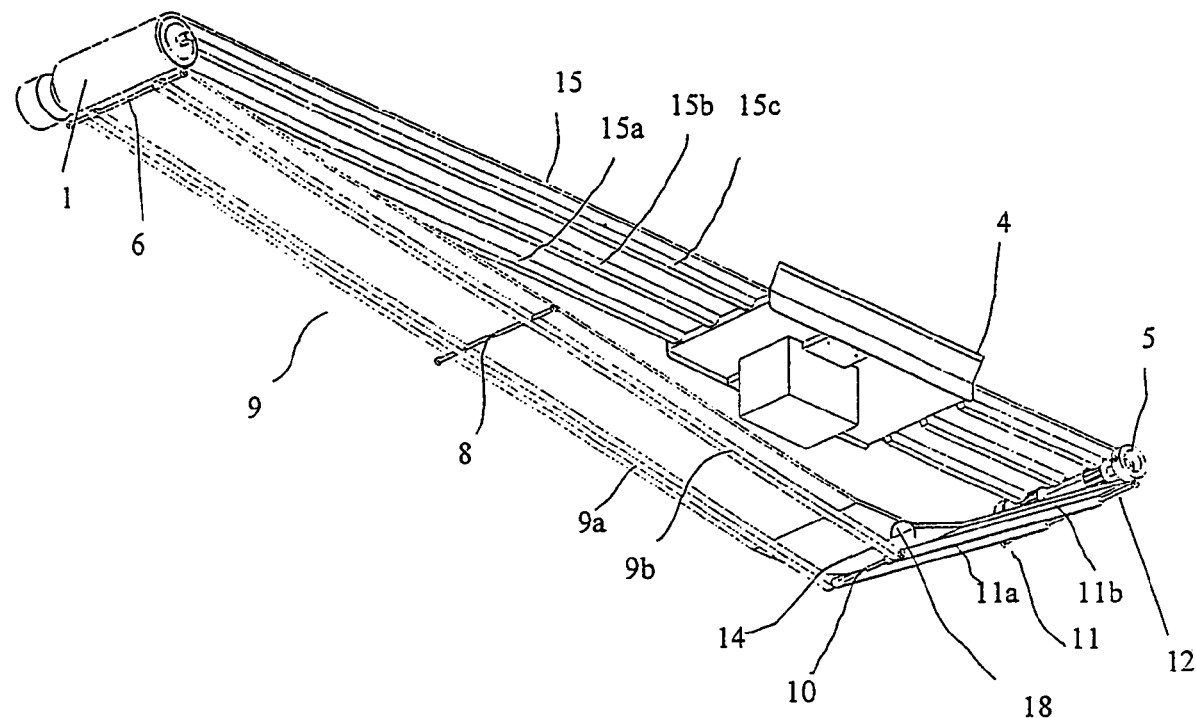
Figure 3:
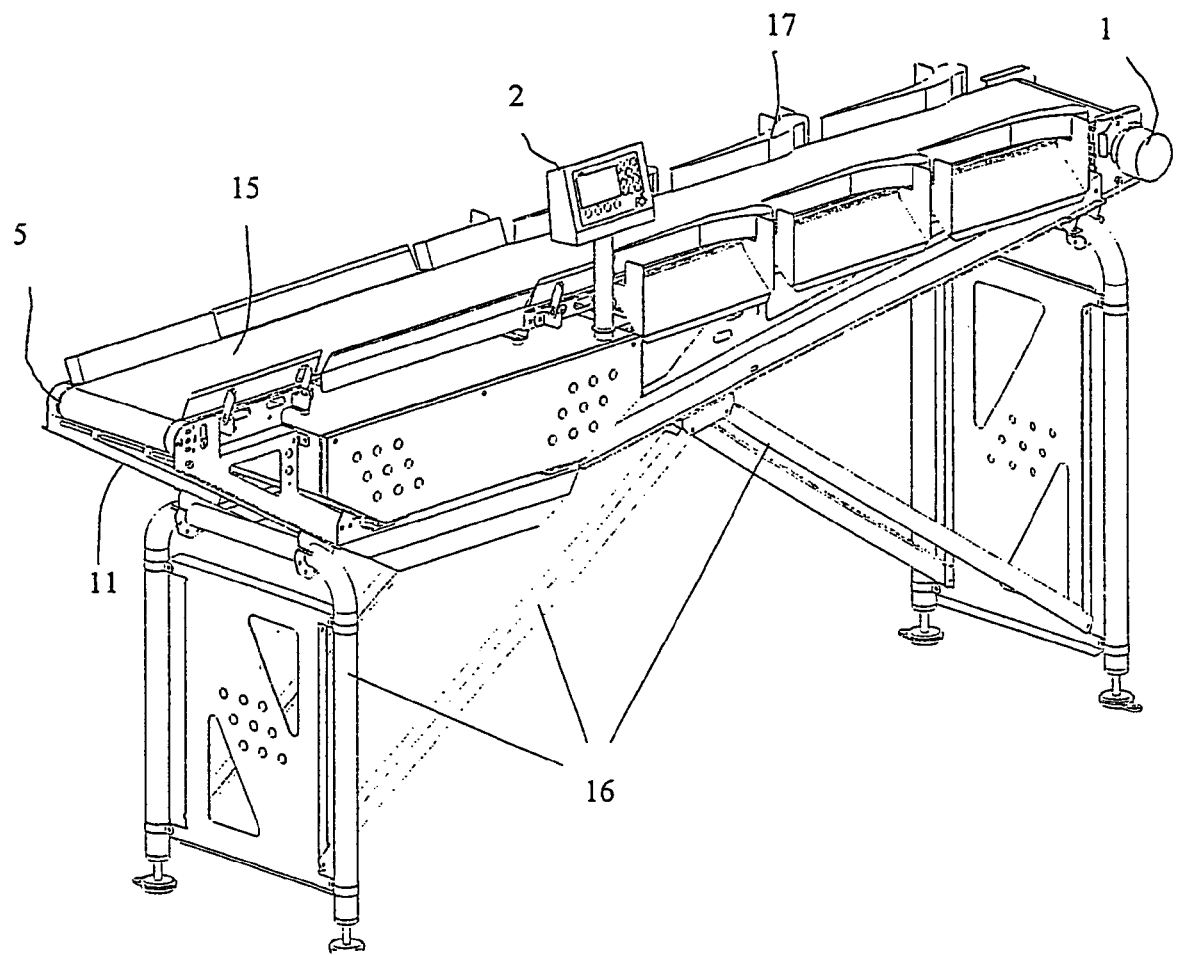

In the following the present invention, and in particular preferred embodiments thereof, will be described in greater details in connection with the accompanying drawings in which FIG. 1 shows one embodiment of a belt weighing apparatus, FIG. 2 shows a perspective of the belt weighing apparatus, and FIG. 3 shows an example of a complete belt weighing apparatus.

FIG. 1 shows an example of a the belt weighing apparatus connected to a computer system 2 in with a built in weighing platform with a driving sprocket 1 for driving the belt 15 and an idle sprocket 5 to ensure a smooth running of the belt. Preferably, the type of belt weighing apparatus of interest for the invention is a belt weigher using modular plastic belt to transport items 3 over the weighing platform 4 in the direction of flow 13, where a further processing is performed. In this embodiment the lower guiding unit of the belt weigher comprises two sub-units 9, 11 for the return-way of the belt. The first sub-unit 9 is mounted to the supporting frame 16 (see FIG. 3) with a first fastening means 6 in a proximity to the driving sprocket 1, and the second sub-unit 11 to a second fastening means 12 in the proximity to the idle sprocket 5. Shown is also an additional fastening means 8 for supporting the longer sub-unit 9 further to the supporting frame and the fastening means at the mutual meeting point 10 where the two sub-units are mounted together.

The belt 15 rests on both the first and second sub-units 9,11, which act as a supporting means for the return-way of the belt. This support prevents the belt from oscillating. To get the necessary tension for the driving mechanism, a part of the belt is hanging freely 14 in the area where the sub-units meet 10. Thermal expansion or contraction of the belt will be reflected in a change in the length of the freely hanging part and therefore the tension (the slack of the freely hanging part), which would have a negative effect on the weighing accuracy. However, this is solved by selecting the coefficients of thermals expansion in the belt and in the lower sub-units such that this change in the length of the freely hanging part is compensated through a change in the length of the sub-units. The result of this is that the length of the freely hanging part remains fixed. Accordingly, thermal expansion of the belt is followed with thermal expansion of the sub-units, and vice verse, a thermal contraction of the belt is followed with a thermal contraction in the sub-units.

The elongation δt due to temperature increase ΔT is given by $$\delta_t = \epsilon_t L = \alpha(\Delta T)L, \quad (1)$$

where L is the length of structural members and $\epsilon_t$ a uniform thermal strain, given by $$\epsilon_t = \alpha(\Delta T), \quad (2)$$

with α as the coefficient of thermal expansion and ΔT the temperature change in Kelvin. Accordingly, if the difference in length between the first and the sub-units is large, the length contraction or expansion will mainly be controlled by the longer sub-unit as equation (1) shows. Furthermore, the angel α between the two sub units is an obtuse angle and wherein 90°<α<180°.

Example of materials with different coefficient of thermal expansion suitable as a sub-units for the belt and optionally the guiding units are:
  Polyamid 6,
  Polyamid 11,
  Polycarbonta,
  Polyetereterketon,
  Polyethylene,
  Polypropylene, and
  Acetal.

Any thermal expansion or contraction of the belt will, as stated before, be compensated by an expansion or contraction of the sub-units, resulting in a move of the meeting point 10 to a lower (expansion of the lower guiding unit) or higher (contraction of the lower guiding unit) position. The tension of the belt must be selected such that it is sufficient so that the driving sprocket wheel has a secure grip on the belt to move the it. Higher tension causes larger error in the weighing.

The computer system is adapted to store all the weighing results and optionally to control the conveying speed and optionally to generate said portions.

FIG. 2 shows a perspective view of the belt weigher from FIG. 1. An upper guiding unit 15 is arranged in the top part of the belt weighing apparatus 20 comprising three rods, 15a, 15b, 15c, defining a first conveying direction, a weighing platform 4, the driving sprocket 1 for driving the belt and an idle sprocket 5. As FIG. 2 shows, the weighing platform is integrated into said upper guiding unit, which divides the upper guiding unit into two set of sub-units. Other embodiments are evidently also possible.

A below guiding units is arranged in the lower part of the belt weighing apparatus comprising two sub-units 9, 11, a first sub-unit 9 comprising two rods 9a, 9b, and a second sub-unit 11 comprising two rods 11a, 11b. These rods are mounted together, preferably with a hinge system 10, such that a rotation in the mutual mounting point between the first and the second sub-units is allowed.

This perspective view of the belt weighing apparatus shows, said first 6 and the second 8 fastening means which are mounted to the supporting framework (not shown) with pins arranged horizontal to the conveying direction, wherein the second fastening means 8 is supported through a split (not shown) in the supporting framework that allows a displacement of the pin 8 when the sliding means expands or contracts, through as an example a temperature fluctuation. The mutual supporting means 10 between the first and the second sub-units allow movement of the below guiding unit so that the angle α 18 between the first and the second sub-units changes when the lower guiding unit expands or contracts.

Accordingly, as the belt 15 expands, it is followed by an expansion of the below guiding unit, so that the slack of the belt in the area of the mutual meeting point 10 remains approximately fixed. If the expansion of the belt would not be followed by a expansion of the below guiding unit the belt in the area of the mutual meeting point would change and therefore the tension of the belt. This would have negative effect on the weighing accuracy. A similar argument may be used for when the belt contraction of the belt.

FIG. 3 shows a complete belt apparatus comprising a supporting framework 16, a computer system 2, an idle sprocket 5 wheel, a driving sprocket wheel 1, a belt 15 and a plurality of computer-controlled arms 17. In the complete picture the arms can for example be used in portioning items into portions of fixed weight, wherein the weighing platforms weighs the objects and the result of the weighing is registered in the computer system. Based thereon makes one or more portions of the objects aiming at minimizing the overweight of a batch.

What is claimed is:

1. A belt weighing apparatus for weighing with high accuracy and maintaining said high accuracy in the weighing by means of maintaining a fixed tension in the belt and preventing the belt from oscillating, said apparatus comprising:
  a supporting frame,
  an upper guiding unit arranged on the supporting frame,
  a first and a second end-supporting means arranged on the supporting frame in a proximity to the opposite ends of the upper guiding unit,
  a motor unit,
  at least one weighing platform arranged in-between the first and a second end-supporting means,
  a lower guiding unit having a first characteristic property arranged on the supporting frame, and
  a conveyor belt having a second characteristic property and forms an endless loop and is extended between said first and a second end supporting means, the motor unit being adapted to move the belt in a revolving manner such that at any instant of time an upper part of the belt rests on the upper guiding unit and the weighing platform defining a conveying part of the belt weighing apparatus, and the lower part of the belt defining the return way of the belt weighing apparatus rests partly on the lower guiding unit that acts as a supporting means while the subsequent part is hanging freely, said support and said freely hanging part being adapted to minimize the oscillation in the belt and to create an optimal tension in the belt so that the accuracy in the weighing is maximized, the first and the second characteristic properties being such that any heat expansion or contraction of the belt will be compensated at least partly through expansion or contraction of the lower guiding unit so that the tension is maintained fixed and therefore the weighing.

2. A belt weighing apparatus according to claim 1, wherein the lower guiding unit comprises an open V-shape structure and wherein the shape of the belt in the return way is concave.

3. A belt weighing apparatus according to claim 1, wherein the two lower guiding units comprises sets of two sub-units mounted together in a mutual meeting points and with the opposite ends of the two sub-units arranged on the supporting frame in a proximity to the opposite ends of the upper guiding unit.

4. A belt weighing apparatus according to claim 1, wherein the angle a. between said sub-units is in the interval 90<α<180°.

5. A belt weighing apparatus according to claim 1, wherein each sub-unit comprises at least two parallel rods of equal length.

6. A belt weighing apparatus according to claim 1, wherein the length $I_1$ of the rods in the first sub-set and the length $I_2$ of the rods in the second sub-set is chosen with the condition that $I_1 > I_2$.

7. A belt weighing apparatus according to claim 1, wherein the freely hanging part of the belt is in the area of the mutual meeting point where the two sets of sub-units meet.

8. A belt weighing apparatus according to claim 1, wherein the characteristic properties are the coefficient of thermal expansion.

9. A belt weighing apparatus according to claim 1, wherein said characteristic properties are selected such that said expansion or contraction of the lower guiding unit followed with said expansion or contraction of the belt is such that the length of the freely hanging part remains fixed.

10. A belt weighing apparatus according to claim 1, wherein mounting the two sub-units in the area of the mutual meeting point is solved through a hinge system that allows a downward movement of the meeting point when the lower guiding unit expands, and movement upwards of the meeting point when the lower guiding unit contracts.

11. A belt weighing apparatus according to claim 1, wherein the guiding units and the belt is made at least one of the following materials:
Polyamid 6,
Polyamid 11,
Polycarbonta,
Polyetereterketon,
Polyethylene,
Polypropylene, and
Acetal.

12. A belt weighing apparatus according to claim 1, wherein the motor unit is integrated into said first end-supporting means, defining a driving sprocket wheel.

13. A belt weighing apparatus according to claim 1, wherein said second end-supporting means is an idle wheel.

14. A method for weighing with high accuracy in a belt weighing apparatus and maintaining said high accuracy in the weighing by means of maintaining a fixed tension in the belt and preventing the belt from oscillating, said method comprising:

providing an upper guiding unit, arranging a first and a second end-supporting means in a proximity to the opposite ends of the upper guiding unit, arranging at least one weighing platform in-between the first and a second end-supporting means, providing a lower guiding unit having a first characteristic property, extending a conveyor belt having a second characteristic property and which forms an endless loop between said first and a second end-supporting means and move the belt in a revolving manner such that at any instant of time an upper part of the belt rests on the upper guiding unit and the weighing platform defining a conveying part of the belt weighing apparatus, and the lower part of the belt defining the return way of the belt weighing apparatus rests partly on the lower guiding unit that acts as a supporting means while the subsequent part is hanging freely, wherein said support and said freely hanging part of the lower part of the belt are adapted to minimize the oscillation in the belt and to create an optimal tension in the belt so that the accuracy in the weighing is maximized, the first and the second characteristic properties being such that any expansion or contraction of the belt will be compensated at least partly through expansion or contraction of the lower guiding unit so that the tension is maintained fixed and therefore the weighing.

* * * * *